(12) United States Patent
Papila et al.

(10) Patent No.: US 10,422,053 B2
(45) Date of Patent: Sep. 24, 2019

(54) STABLE ELECTROSPINNING COMPOSITION FOR STABLE NANO-/SUBMICROSTRUCTURE PRODUCTION AND PREPARATION METHOD THEREOF

(71) Applicant: Sabanci Üniversitesi, Istanbul (TR)

(72) Inventors: Melih Papila, Istanbul (TR); Ayca Ürkmez, Istanbul (TR); Kaan Bilge, Istanbul (TR); Eren Simsek, Istanbul (TR); Yusuf Z. Menceloglu, Istanbul (TR); Elif Özden Yenigun, Istanbul (TR)

(73) Assignee: SABANCI UNIVERSITESI, Istanbul (TR)

( * ) Notice: Subject to any disclaimer, the term of this patent is extended or adjusted under 35 U.S.C. 154(b) by 25 days.

(21) Appl. No.: 15/576,695

(22) PCT Filed: May 22, 2015

(86) PCT No.: PCT/TR2015/000227
§ 371 (c)(1),
(2) Date: Nov. 22, 2017

(87) PCT Pub. No.: WO2016/190826
PCT Pub. Date: Dec. 1, 2016

(65) Prior Publication Data
US 2018/0135207 A1  May 17, 2018

(51) Int. Cl.

| | | |
|---|---|---|
| *D01D 10/00* | (2006.01) |
| *D01F 6/36* | (2006.01) |
| *B29C 48/05* | (2019.01) |
| *B29C 48/00* | (2019.01) |
| *B29C 48/91* | (2019.01) |
| *B29C 48/14* | (2019.01) |
| *D01D 5/00* | (2006.01) |
| *C08G 59/68* | (2006.01) |
| *C08G 59/42* | (2006.01) |
| *D01D 10/02* | (2006.01) |
| *D01F 1/10* | (2006.01) |
| *C08F 212/08* | (2006.01) |
| *C08F 220/32* | (2006.01) |
| *C08J 3/24* | (2006.01) |
| *C08F 8/14* | (2006.01) |
| *C08F 8/30* | (2006.01) |
| *B29K 33/00* | (2006.01) |
| *B29K 105/00* | (2006.01) |

(52) U.S. Cl.
CPC .............. *D01F 6/36* (2013.01); *B29C 48/022* (2019.02); *B29C 48/05* (2019.02); *B29C 48/142* (2019.02); *B29C 48/91* (2019.02); *C08F 8/14* (2013.01); *C08F 8/30* (2013.01); *C08F 212/08* (2013.01); *C08F 220/32* (2013.01); *C08G 59/42* (2013.01); *C08G 59/686* (2013.01); *C08J 3/24* (2013.01); *C08J 3/247* (2013.01); *D01D 5/0007* (2013.01); *D01D 5/0038* (2013.01); *D01D 5/0046* (2013.01); *D01D 10/02* (2013.01); *D01F 1/10* (2013.01); *B29K 2033/08* (2013.01); *B29K 2033/12* (2013.01); *B29K 2105/0014* (2013.01); *C08F 2220/325* (2013.01); *C08F 2810/20* (2013.01); *C08J 2325/14* (2013.01); *C08J 2333/14* (2013.01)

(58) Field of Classification Search
CPC ... B29K 2033/12; B29K 2033/14; C08F 8/14; C08F 212/08; C08F 220/32; C08F 2220/322; C08F 2810/20; C08G 59/42; C08G 59/686; C08J 3/24; C08J 2325/14; C08J 2333/14; D01D 5/0007; D01D 5/0038; D01D 5/0046; D01D 10/02; D01F 1/10; D01F 6/36
USPC .............. 264/10, 236, 464, 465, 466, 484; 525/327.2
See application file for complete search history.

(56) References Cited

U.S. PATENT DOCUMENTS

| | | |
|---|---|---|
| 3,052,650 A | 9/1962 | Wear et al. |
| 2002/0176994 A1* | 11/2002 | Shalati ................. C08G 59/686 428/413 |
| 2011/0020917 A1* | 1/2011 | Wen .......................... D01F 1/10 435/283.1 |
| 2012/0178332 A1 | 7/2012 | Uchida et al. |

FOREIGN PATENT DOCUMENTS

| | | |
|---|---|---|
| EP | 0462840 A1 | 12/1991 |
| KR | 20100126094 A | 12/2010 |
| WO | 2005021845 A1 | 3/2005 |

OTHER PUBLICATIONS

Elif Ozden et al, "Engineering Chemistry of Electrospun Nanofibers and Interfaces in Nanocomposites for Superior Mechanical Properties", Acs Applied Materials and Interfaces, vol. 2, No. 7, Jun. 10, 2010, p. 1788-1793.

Xia Wang et al, "Epoxy Resin Nanofibers Prepared Using Electrospun Core/Sheath Nanofibers as Templates", Macromolecular Materials and Engineering, vol. 298, No. 6, Sep. 19, 2012, p. 664-669.

* cited by examiner

*Primary Examiner* — Leo B Tentoni
(74) *Attorney, Agent, or Firm* — Gokalp Bayramoglu

(57) ABSTRACT

The present invention discloses an electrospinning composition comprising a catalyst and a functionalized polymer or copolymer bearing one or more epoxy ring. The mixture further comprises an anhydride, preferably phthalic anhydride as a cross-linking agent. Wherein a molar ratio of epoxy to anhydride in the electrospinning composition is within the range of 1:1 to 50:1. The present invention further discloses a preparation method of the electrospinning composition and an electrospun nano-/submicrostructures prepared using the method and composite material comprising the electrospun nano-/submicrostructures.

18 Claims, 5 Drawing Sheets

STABLE ELECTROSPINNING COMPOSITION FOR STABLE NANO-/SUBMICROSTRUCTURE PRODUCTION AND PREPARATION METHOD THEREOF

TECHNICAL FIELD OF THE INVENTION

The present invention relates to an electrospinning composition, nano-/submicrostructures produced using such electrospinning composition, a composite material provided with such nano-/submicrostructures, and a preparation method thereof.

BACKGROUND OF THE INVENTION

Chemical crosslinking is an effective way to deal with solvent and heat susceptibility of polymeric nano-/submicrostructures manufactured by electrospinning. From a very simple point of view, the crosslinking can be considered as an irreversible interconnection of polymer chains by either covalent or ionic chemical bonds. Cross-linking of electrospun nano-/submicrostructures is desired mainly for obtainment of robust products which resists against glass-transition or melting-like effects in elevated temperatures, and also against swelling or dissolving in solvents. Thus, undesired morphological deviations of electrospun structures above polymer-specific temperature limits (mainly $T_g$), along with susceptibility against solvents can be avoided by cross-linking the polymeric material constituting the product.

Bonding between individual polymer chains via crosslinking restricts their movement and causes an inherent increase in the viscosity. This is unfavorable in polymer processing applications as they typically require shear mixing which demands mobility of the polymer chains. In electrospinning, individual polymer chains in a polymer solution are drawn as nano- or submicroscaled structures in form of fibers under high voltage typically through a nozzle/orifice with a very small diameter (~1 mm), and high viscosities in electrospinning mixtures render the flow through such narrow nozzle more difficult i.e. more energy-consuming. This concern applies also for needleless electrospinning methods e.g. free-surface electrospinning, sharp edge or pointed tip electrospinning etc.; since electrospinning methods generally comprise releasing of an electrospinning mixture through a release means which can be a nozzle, an orifice, a needle etc. or from an open surface which can be of cylindrical, spherical, wire, pin and slot type electrodes etc.

Typically, a constant flow rate is desired for an uninterrupted flow of an electrospinning mixture for obtaining continuous nano-/submicrostructures therefrom. Thus during electrospinning, fluidic properties of the electrospinning mixtures, especially its viscosity, are typically required to be constant/stable within certain limits for desired form of deposition of the electrospinning mixture, such as continuous fiber form. External effects such as fast solvent evaporation and/or crosslinking throughout the electrospinning process increase the viscosity of the electrospinning mixture and restrain the electrospinning process.

Chemical cross-linking can be performed externally on mats of electrospun nano-/submicrostructures by exposure of the mats to a cross-linking medium (as in ex-situ methods addressed in the below Table 1). Alternatively, cross-linking can be initiated in-situ by introducing cross-linking agents to polymer solutions prior to electrospinning. Ex-situ cross-linking herein can be classified as more conventional and as a direct way to achieve cross-linking by permanently changing the chemistry of nano-/submicrostructures. Whereas, in situ cross-linking methodology is relatively new and is a more controllable bulk cross-linking technique in comparison with other techniques. In-situ cross-linking requires an initiation event (by providing energy onto the polymer in form of heat, UV etc.) that is tunable according to the type of application by choosing a correct composition of polymer mixture to be used in electrospinning.

Main potential problems driven by premature cross-linking in the polymer solution (i.e. cross-linking initiated and/or accelerated before or during the electrospinning) are interruption of flow continuity of an electrospinning mixture through a nozzle (or any respective release means as mentioned above) and choking of solidified polymer in the nozzle. In other words, regardless of the electrospinning method, the electrospinning of polymer solutions containing any crosslinking agents is typically limited with the cross-linking reaction time.

Thus, it is necessary to provide a method for obtaining of an electrospinning composition which maintains a desired viscosity even after several hours from preparation of thereof. The term 'desired viscosity' refers to viscosity values suitable for electrospinning. It is further necessary to provide a method for obtainment of heat and solvent resistant, stimuli-self-crosslinkable nano-/submicrostructures.

TABLE 1

Benchmarking of state-of-the-art techniques for cross-linking, and their main drawbacks.

| | Cross-linking type | | Drawbacks |
|---|---|---|---|
| Ex-situ | Exposing an electrospun fiber mat to a fluid cross-linking medium (liquid or vapor), or spraying a cross-linking agent thereon | | Time consuming. Causes substantial morphological changes. |
| In-situ | Processes requiring an additional set-up | Using an UV-light source | Restricted with UV-curable polymers. Requires additional equipment. |
| | | Using a dual-syringe reactive cross-linking set-up | Additional viscosity modifiers and removal of them. Time consuming. |
| | Post-electrospinning treatment | Heat treatment | Curing temperature restrictions and related morphological changes based on the glass-transition temperature ($T_g$) of the polymer. |

TABLE 1-continued

Benchmarking of state-of-the-art techniques for cross-linking, and their main drawbacks.

| Cross-linking type | Drawbacks |
|---|---|
| Single step in-situ cross-linking | Viscosity changes during electrospinning. Time-dependent procedure. |

OBJECTS OF THE INVENTION

Primary object of the present invention is to overcome the abovementioned shortcomings of the prior art.

Another object of the present invention is to provide a method for obtainment of an electrospinning composition which maintains its viscosity even after considerable processing times with an order of magnitude of days from preparation thereof.

A further object of the present invention is to provide a method for obtainment of stimuli-self-crosslinkable, heat and solvent resistant nano-/submicrostructures.

Further an object according to the present invention is to provide a low-cost method for obtainment of cross-linked electrospun nano-/submicrostructures.

Further an object according to the present invention is to provide heat and solvent resistant electrospun nano-/submicrostructures and composite material comprising such electrospun nano-/submicrostructures.

SUMMARY OF THE INVENTION

The present invention proposes an electrospinning composition comprising a catalyst and a functionalized polymer or copolymer bearing one or more epoxy ring, said mixture further comprises an anhydride, preferably phthalic anhydride as a cross-linking agent; wherein the epoxy:anhydride molar ratio in the electrospinning composition is within the range between 1:1 and 50:1. The present invention further proposes a method for preparation of such electrospinning composition, electrospun nanostructures prepared using said method and composite material comprising such electrospun nanostructures.

BRIEF DESCRIPTION OF THE FIGURES

The figures, whose brief explanations are herewith provided, are solely intended for providing a better understanding of the present invention and are as such not intended to define the scope of protection or the context in which said scope is to be interpreted in the absence of the description.

FIG. 1 (a) shows the functionalized copolymer according to an embodiment of the method according to the present invention; and (b) shows chemical interaction between the catalyst and the cross-linking agent according to an embodiment of the present invention.

FIG. 3 shows SEM photographs of electrospun nanostructures obtained according to (a) the prior art, and (b) the present invention.

FIG. 5 are SEM images showing the effect of temperature above glass-transition temperature of functionalized copolymer used in (a) non-cross-linked and (b) cross-linked nano-/submicrostructures prepared according to an embodiment of the method described in the present application, on nanostructure morphology.

DETAILED DESCRIPTION OF THE INVENTION

Referring now the figures outlined above, the present invention proposes an electrospinning composition, a method for obtainment electrospun nanostructures from said electrospinning composition, and composite material provided with such electrospun nanostructures. The fields of application include membranes, filters, polymer nanocomposites, adhesive films and polymer matrix composites.

The electrospinning composition according to the present invention comprises a catalyst which is preferably a tertiary amine, more preferably tributyl amine (TBA); said mixture further comprises an anhydride as cross-linking agent, and the mixture further comprises a functionalized polymer or copolymer bearing one or more epoxy ring.

The electrospinning composition obtained according to the present invention is stimuli-self-crosslinkable, wherein the term "stimuli-self-crosslinkable" is used to purport that the electrospinning composition is spinnable without cross-linking of the functionalized polymer or copolymer until a suitable/custom transfer of energy onto electrospun material, preferably until a heat-driven post-processing such as cure cycle of a polymeric resin is in effect for deliberate, controlled cross-linking.

The catalyst and cross-linking agent used in the method according to the present invention are required to be selected such that they both comply with selected heating profile applied in thermal treatment. Preferably, the cross-linking kinetics is rather slow and requires a rather moderate temperature which is still clearly higher than room/ambient temperature, for initiation. Chemical interaction mechanism between epoxy rings and anhydrides and required activation energy extents therefore allows such optimal kinetics, by abovementioned epoxy:anhydride molar ratios.

The cross-linking agent is an anhydride, preferably phthalic anhydride (PA). As mentioned above, the functionalized polymer or copolymer comprises one or more epoxy ring, and to maintain the tendency and rate of opening of said epoxy ring, thus for optimized crosslinking kinetics, the molar ratio of epoxy rings of the functionalized polymer or copolymer to anhydride within the electrospinning composition (epoxy:anhydride molar ratio) is highly important to achieve controllability of self-crosslinkability of the electrospinning composition. Said epoxy:anhydride molar ratio for use in the electrospinning composition is within the range between 1:1 and 50:1, preferably within the range between 2:1 and 10:1; more preferably within the range between 4:1 and 6:1; even more preferably within the range between 4.5:1 and 5.5:1.

In a preferred embodiment according to the present invention, the functionalized copolymer is styrene/glycidyl methacrylate copolymer and the catalyst is tributyl amine.

A further aspect of the present application is electrospun nanostructures prepared using the electrospinning composition according to the present invention. Another aspect of the present application is a composite material comprising such electrospun nanostructures.

A further aspect of the present application is to provide a method for preparing an electrospinning mixture by preparation of a mixture comprising a catalyst and an anhydride and merging said mixture with a polymer solution comprising a functionalized polymer or copolymer, said functionalized polymer or copolymer having one or more epoxy ring, such that the epoxy:anhydride molar ratio in the electrospinning composition is within the range between 1:1 and 50:1, preferably within the range between 2:1 and 10:1, more preferably 4:1 and 6:1; and even more preferably within the range between 4.5:1 and 5.5:1.

A further aspect of the present application is to provide a method for obtainment of electrospun nano-/submicrostructures, said method comprises the following steps:
 a) obtainment of the above-described electrospinning composition;
 b) obtaining an electrospun material by electrospinning said electrospinning composition; and
 c) in-situ cross-linking of electrospun material of the step (b) by thermal treatment under a temperature higher than 50° C. and lower than the glass transition temperature of the functionalized polymer or copolymer.

An electrospinning composition must be spinnable, which means it must have a viscosity suitable for electrospinning. The molecular weight of the functionalized polymer or copolymer (i.e. polymeric material) must provide suitable physical conditions/properties for electrospinning. If said molecular weight is too low or too high, the flow properties (especially the viscosity) of the electrospinning composition is not suitable for electrospinning; in other words, in that case the composition is not spinnable. A person skilled in the art is considered to be able to decide suitable flow properties for spinnability, and molecular weights for use in electrospinning compositions for respective polymeric materials.

Since the epoxy ring and anhydride are substantially idle against chemical interaction until about slightly higher temperatures than 50° C., the electrospinning composition obtained according to the above considerations maintains its viscosity even after considerable processing times with an order of magnitude of days from preparation of thereof. Thus the electrospinning composition is highly stable in terms of flow/fluidic properties over time. The method according to the present invention is especially useful to control the nano-/submicrostructures morphology through cross-linking and thus to obtain heat and solvent resistant nano-/submicrostructures.

The polymer solution is to be prepared in a suitable solvent for the functionalized polymer or co-polymer and cross-linking agents for the sake of homogeneity. Such suitable solvent is to be selectable by a skilled person in the art e.g. by considering polarities of the ingredients of respective polymer solution. Any kind of particle addition to the polymer solution can also be performed at this step by paying special attention to particle-copolymer interactions to avoid agglomerations. Following this step, the electrospinning parameters must be tuned for the manufacturing of nano-/submicrostructures with desired fiber diameters, using technical knowledge available to a skilled person in the art. Electrospinning can be done over any surface/substrate including carbon, glass, aramid fibers, prepreg materials, resin films, adhesive films, thin films and conventional aluminum sheets in presence of a very conductive collector/electrode to hold/support the substrate material and the spun nano-/submicrostructures. Stimuli-self-crosslinkable nano-/submicrostructures and their preparation method according to the present invention are applicable over/integrated onto raw materials such as dry textile reinforcements, fiber reinforced prepregs and polymer based adhesive/resin film materials which are commonly used in polymeric composite manufacturing processes.

One further aspect of the present invention is obtainment of a functionalized copolymer for use in the electrospinning composition, by functionalization of a base polymer by addition of one or more epoxy group thereto. An important advantage of this methodology is that it is applicable to any kind of engineering/industrial polymer (e.g. polyacrylonitrile, polystyrene, polypropylene, polyvinyl butyral, etc.) as base polymer that can be functionalized with epoxy groups. The functionalization renders the cross-linking reaction independent from the chemical structure of the base polymer, as long as the base polymer is not already cross-linkable without functionalization. Epoxy groups tend to be reactive in presence of another active group through a copolymerization reaction as exemplified in FIG. 2, where the functionalized copolymer is styrene/glycidyl methacrylate copolymer.

With the method according to the present invention, stimulation/triggering of cross-linking of the functionalized polymer or copolymer is avoided until step (c) where the cross-linking is stimulated/triggered, namely where the electrospun material is heated to a temperature range substantially higher than the room temperature and yet lower than glass-transition temperature of selected functionalized polymer or copolymer. Thus, the electrospinning composition maintains its viscosity even after the electrospinning step (b) is complete. Here, it is assumed that the preparation and storage (where applicable) of the electrospinning composition and the electrospinning step (b) are performed at temperatures lower than a corresponding temperature used for cross-linking for a respective functionalized polymer or copolymer.

Moreover, the invention refers to self cross-linking ability that can be introduced to already functionalized copolymers by the addition of a catalyst and an anhydride as cross-linking agent. The amount of catalyst in the electrospinning composition such that premature cross linking (i.e. cross-linking before thermal treatment) is kept within a negligible extent; this is preferably achieved by keeping the amount of the catalyst ratio within the range between 0.01% and 0.02% (w/w) with respect to the weight of the functionalized polymer or copolymer. Problematic changes in flow behavior of the composition due to premature cross-linking are avoided and hassle-free electrospinning is provided.

In other words, the electrospinning composition according to the present invention is idle against cross-linking before and during electrospinning, and is only suitable for cross-linking with deliberately applying thermal energy thereon. By arranging the temperature range in cross-linking step (c) lower than glass-transition temperatures of the functionalized polymer or copolymer, the final morphology of the cross-linked product is predictable and tunable by electrospinning conditions. That is, electrospun material morphology is substantially the same with that of the cross-linked nano-/submicrostructures obtained with step (c). Additionally, the electrospun material morphology is maintained throughout the electrospinning process notwithstanding the duration of the electrospinning process.

In a preferred embodiment of the method according to the present invention, the functionalized copolymer is styrene/glycidyl methacrylate copolymer, Poly(St-co-GMA), which can be obtained by solution polymerization of polystyrene (PS) with glycidyl methacrylate (GMA) obtained according to a method described by Özden et. al. (Özden et. al, "Engineering Chemistry of Electrospun Nanofibers and Interfaces in Nanocomposites for Superior Mechanical Properties", ACS Applied Materials and Interfaces, 2010, 2 (7), pp 1788-1793).

The thermal treatment in step (c) is to be performed under a temperature which is lower than the glass-transition temperature of the functionalized polymer or copolymer.

For instance, optimal thermal treatment temperature for cross-linking where Poly(PS-co-GMA) is selected as the functionalized copolymer, is determined to be within the range between 55° C. and 90° C., more preferably within the range between 55° C. and 65° C.

The thermal treatment is performed preferably for a duration longer than 15 minutes, more preferably within the range between 1 hour and 3 hours, even more preferably within the range between 1.5 hours and 2.5 hours.

In a further preferred embodiment of the method according to the present invention, the functionalized copolymer is Poly(St-co-GMA); the catalyst is tributyl amine (TBA); and the cross-linking agent is phthalic anhydride; and the epoxy:anhydride molar ratio within the electrospinning composition is within the range between 1:1 and 50:1, preferably within the range between 2:1 and 10:1; more preferably within the range of 4:1 to 6:1; and even more preferably within the range of 4.5:1 to 5.5:1. According to this embodiment, the thermal treatment temperature is preferably within the range of 55-90° C., more preferably within the range of 55-65° C.

Figure 1:
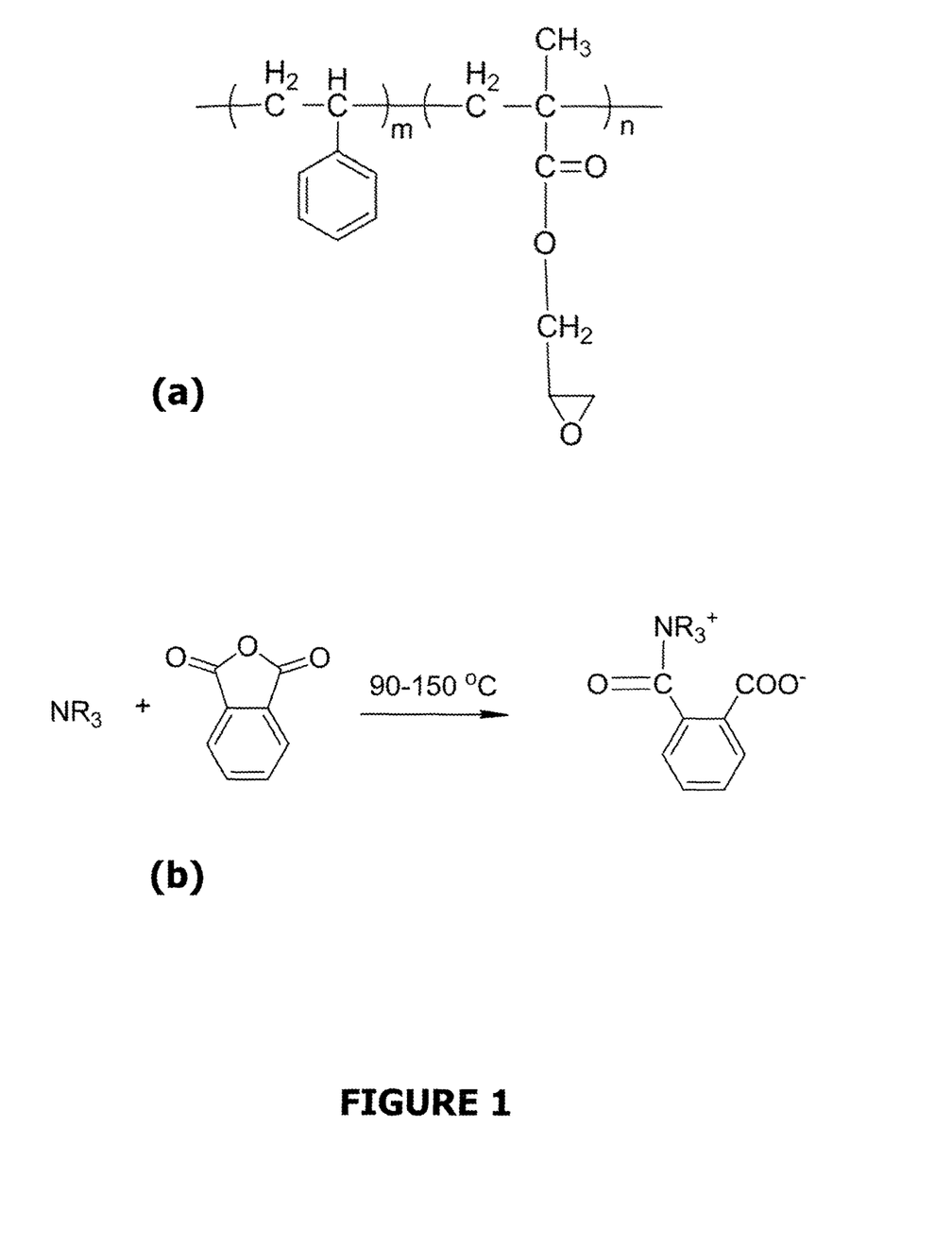

FIG. 1 (a) shows the functionalized copolymer according to an embodiment of the method according to the present invention; and (b) shows chemical interaction between the catalyst and the cross-linking agent according to an embodiment of the present invention. In FIG. 1 (a), the functionalized copolymer is Poly(St-co-GMA); in FIG. 1 (b) the cross-linking agent is phthalic anhydride.

Figure 2:
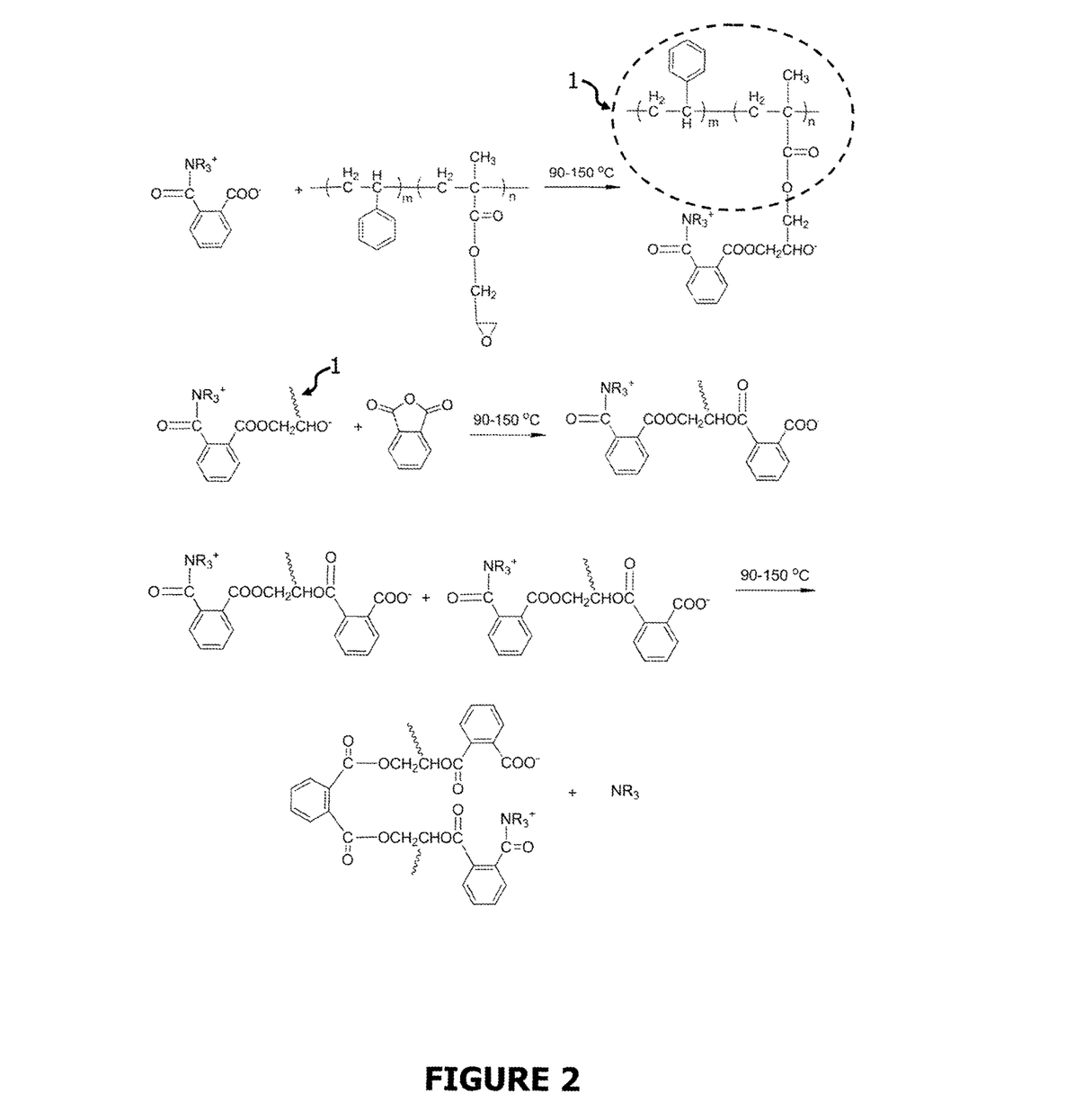
FIG. 2 represents respective cross-linking steps using the substances in FIG. 1.

FIG. 2 represents respective cross-linking steps using the substances in FIG. 1. Here, a polymer chain to be cross-linked is represented with the numeral 1.

The term 'stimuli-self-crosslinkable' is used for denoting that the electrospinning composition is spinnable without cross-linking of the polymeric content thereof until a suitable/custom heat-driven post-processing in step (c) is in effect for deliberate cross-linking of the nano-/submicrostructures.

An exemplary lab-scale experiment about preparation of electrospun nanostructures by the method according to the present invention is described below. By giving said example, it is solely intended to provide a better understanding of the present invention and is as such not intended to limit the scope of the appended claims.

EXAMPLE

Sample 1

An electrospinning composition is prepared by admixing a mixture comprising tributyl amine as catalyst and phthalic anhydride, with a polymer solution comprising styrene/glycidyl methacrylate copolymer. An electrospun material is produced from said electrospinning composition according to the above-described method. Thermal treatment is performed on said electrospun material by applying a temperature of 60° C. thereon for 2 hours.

Sample 2

For comparison with external initiator spraying method according to the prior art, a comparative sample of electrospun structures was prepared using a respective electrospinning composition which does not comprise catalyst. Catalyst (ethylene diamine) was sprayed onto said comparative sample for in-situ cross-linking.

The GMA:PA molar ratio (which is equivalent to the epoxy:anhydride molar ratio) in the electrospinning composition is arranged to be 5:1 in preparation of both samples, which is found to be the optimal value for the ingredients of the electrospinning compositions.

Tertiary amines are found to be very suitable for use in electrospinning compositions used in experiments in relevance with the present invention.

Figure 3:
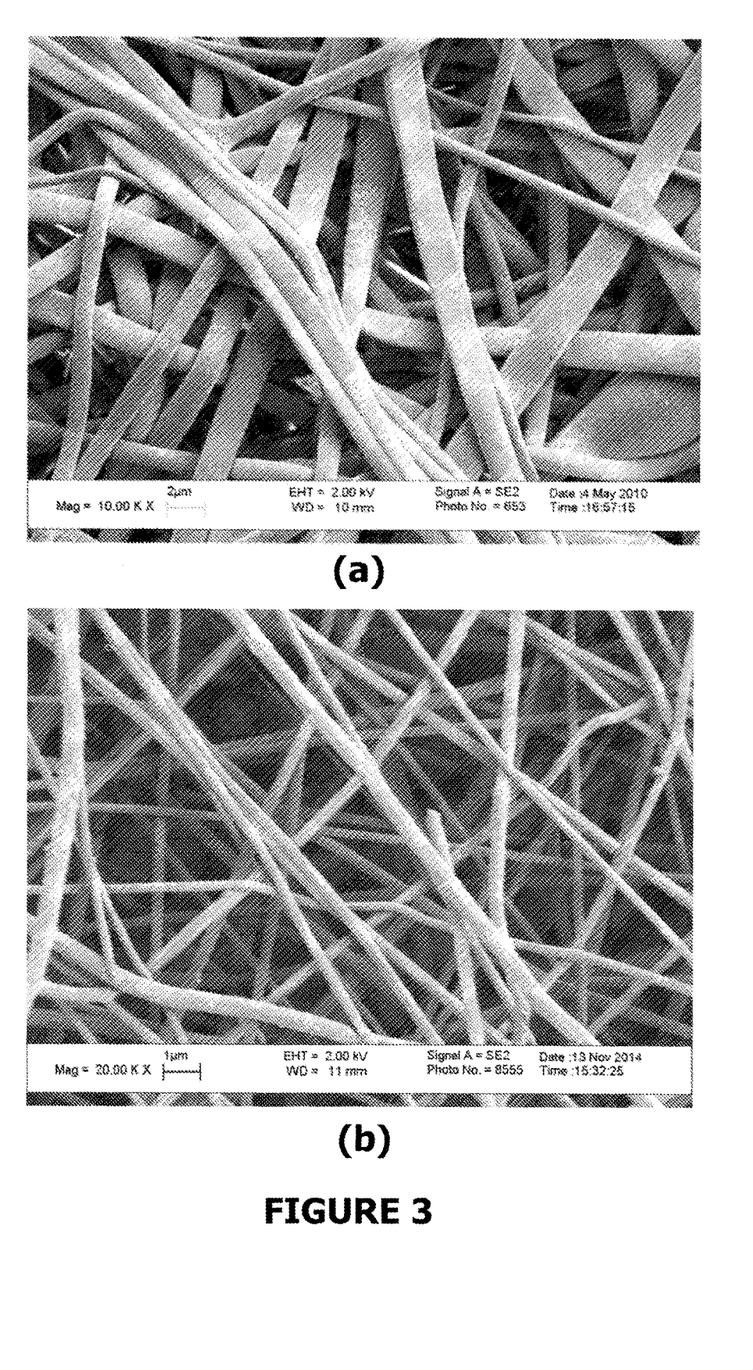

FIG. 3 comparatively shows SEM photographs of electrospun Poly(St-co-GMA) nano-/submicrostructures cross-linked (a) by external ethylene diamine spraying (Sample 2), and (b) with the method according to the present invention (Sample 1). As clearly visible in the FIG. 3, the nanostructures obtained from Sample 1 according to the present invention have higher homogeneity in nanofibrous morphology. This also proves that the method according to the present invention is extremely advantageous for industrial application where long production times are required. Apart from that, proposed method does not cause any kind of swelling of cross-linking agent.

Figure 4:
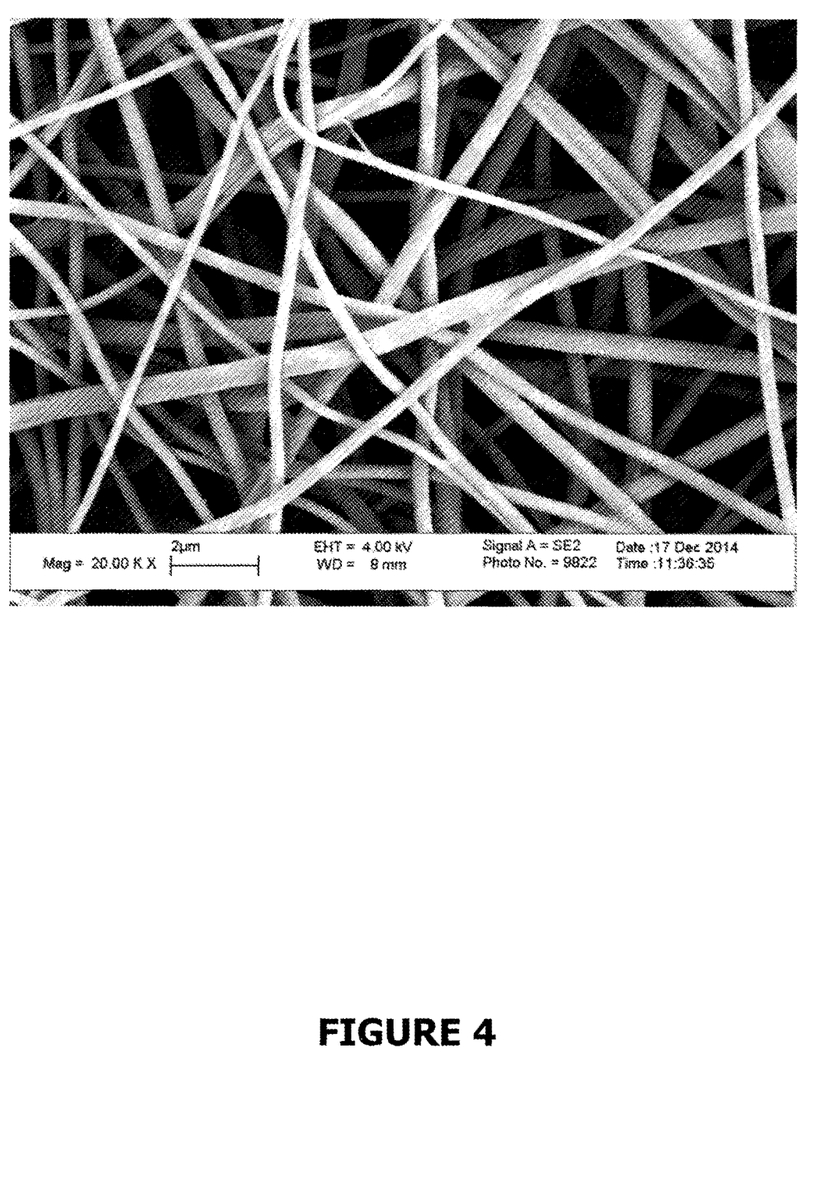
FIG. 4 shows SEM photographs of electrospun nanostructures obtained according to the present invention after being subjected to tetrahydrofuran for 3 days.

Furthermore, the nanostructures obtained according to the present invention are completely solvent resistant and preserve their nanofibrous morphologies even when exposed to organic solvents. With the outcomes of the invention both heat and solvent induced morphology changes of nano-/submicrostructures are reduced to "no change" rather than "less effected" term that is typically used in literature. FIG. 4 shows the morphology of cross-linked nano-/submicrostructures prepared from Sample 1 according to the present invention exposed to a powerful organic solvent (tetrahydrofuran, THF) for up to 3 days which is processed above the glass transition temperature of the copolymer of Sample 1. The Sample 1 has also resisted to dimethyl formamide (DMF) in a similar solvent resistance test. Thus, it is reasonable to claim that the nanostructures obtained according to the present invention are highly solvent-resistant to a wide variety of organic solvents, since THF and DMF are known as very effective in solving polymeric materials.

Figure 5:
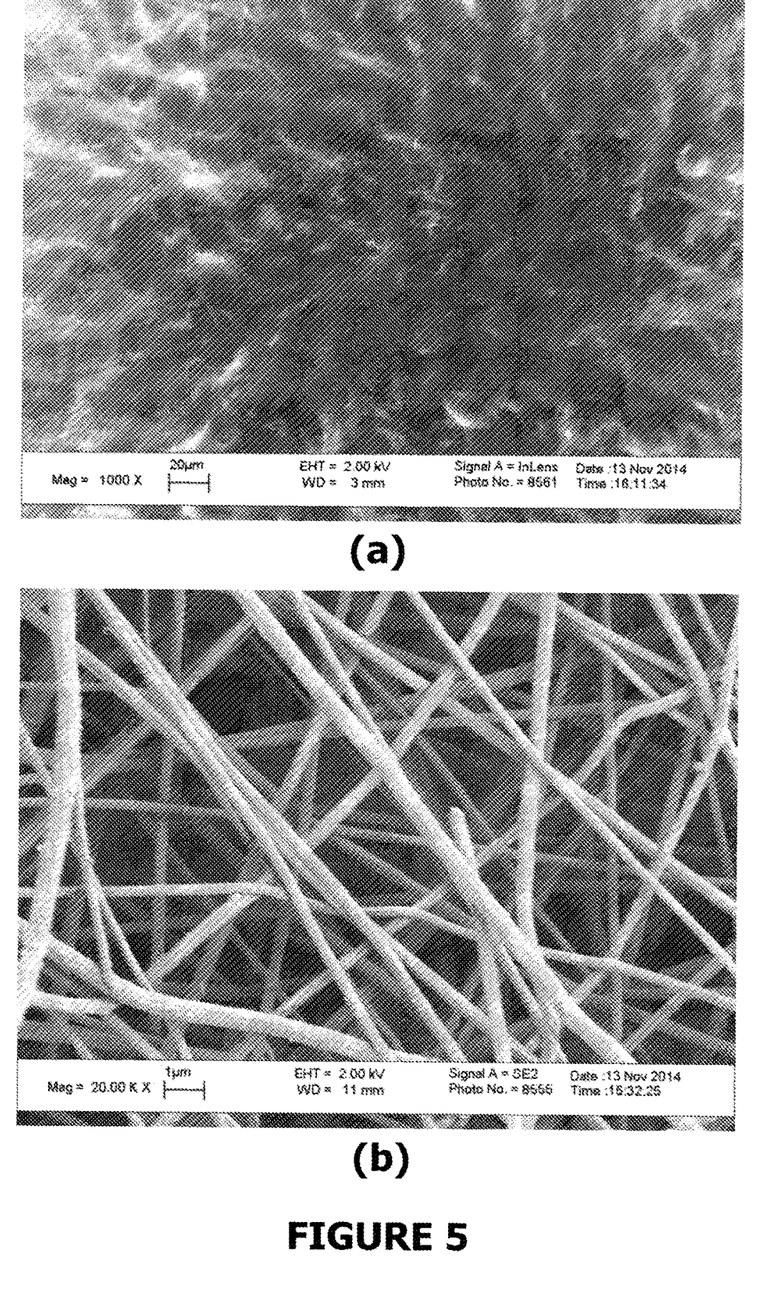

FIG. 5 shows the effect of $T_g$ on non-cross-linked and cross-linked nano-/submicrostructures prepared according to the present example. Both non-cross-linked electrospun material and cross-linked electrospun material according to the step (c), both of which were electrospun from Sample 1, were kept under 150° C. (which is about 50° C. higher than the $T_g$ of the copolymer used in Sample 1) for 2 h and respective SEM images thereof are taken after cooling the samples down to the room temperature. Said SEM images are presented as FIGS. 5 (a) and (b), respectively. The FIG. 5 can be taken as a visual proof of the heat resistance of the nanomaterials when cross-linking is applied according to the present invention.

Thus, electrospun nanostructures according to the present invention are highly resistant to widely used organic solvents and they are further highly resistant to heat. Said advantages are also inherent in composite materials provided with such electrospun nanostructures, and formations (e.g. hierarchical reinforcements, prepregs) and processing of such composite materials. Therefore the present application also claims such electrospun nanostructures and composite materials provided with such nanostructures.

The suitable temperature ranges for in-situ cross-linking (i.e. temperatures lower than glass-transition temperatures of selected functionalized polymers or copolymers, e.g. 60° C. for Poly(PS-co-GMA)) can be considered as very moderate in terms of e.g. operating costs. Such temperature range is further advantageous since precise temperature control in this temperature range is way easier than main in-situ temperature ranges in state-of-the-art which may be up to 200° C. as in the example of high performance polymer matrix composites.

Furthermore, energy consumption and process equipment costs for reaching the temperature range used in the present method are also lower in comparison with those used for said temperature ranges in state-of-the-art. Consequently, the safety requirements to be considered and related costs are also lower in comparison therewith. Thus, the present invention further provides a low-cost method for obtainment of cross-linked electrospun nanostructures.

In a preferred embodiment of the method according to the present invention, the electrospinning composition further comprises solid particles such that the electrospinning composition is a dispersion of said solid particles.

Following objects are thus achieved with the present invention:
- overcoming the abovementioned shortcomings of the prior art;
- provision of a method for obtainment of an electrospinning composition which maintains its viscosity even after considerable processing times with an order of magnitude of days from preparation thereof;
- provision of a method for obtaining stimuli-self-cross-linkable, heat and solvent resistant nano-/submicrostructures; and
- provision of a low-cost method for obtainment of cross-linked electrospun nano-/submicrostructures.
- Provision of heat and solvent resistant electrospun nano-/submicrostructures and composite materials comprising such electrospun nano-/submicrostructures.

What is claimed is:

1. A preparation method for an electrospinning composition, comprising the steps of: preparing a mixture comprising a solvent, a catalyst and an anhydride, merging the mixture with a polymer solution comprising a functionalized polymer or copolymer, wherein the functionalized polymer or copolymer has one or more epoxy ring to make a molar ratio of epoxy to anhydride in the electrospinning composition within the range of 1:1 to 50:1.

2. The method according to claim 1, wherein the functionalized copolymer is a styrene/glycidyl methacrylate copolymer, and the catalyst is a tributyl amine.

3. The method according to claim 1, wherein the anhydride is used as a cross-linking agent.

4. The method according to claim 1, wherein the anhydride is a phthalic anhydride.

5. The method according to claim 1, wherein the catalyst is a tertiary amine.

6. The method according to claim 1, wherein the catalyst is a tributyl amine.

7. The method according to claim 1, wherein the molar ratio of epoxy to anhydride is within the range of 2:1 to 10:1.

8. The method according to the claim 1, wherein the molar ratio of epoxy to anhydride is within the range of 4:1 to 6:1.

9. The method according to claim 1, wherein the molar ratio of epoxy to anhydride is within the range of 4.5:1 to 5.5:1.

10. The method according to claim 1, wherein the functionalized copolymer is a styrene/glycidyl methacrylate copolymer, and the catalyst is a tributyl amine.

11. A preparation method for obtaining an electrospun nano-/submicrostructures, comprising the following steps:
    a) preparing of an electrospinning composition;
    b) electrospinning the electrospinning composition to obtain an electrospun material; and
    c) in-situ cross-linking the electrospun material obtained in step (b) by a thermal treatment under a temperature higher than 50° C. and lower than a glass transition temperature of a functionalized polymer or copolymer;
    wherein the electrospinning composition is prepared by a method comprising the steps of: preparing a mixture comprising a solvent, a catalyst and an anhydride, merging the mixture with a polymer solution comprising the functionalized polymer or copolymer, wherein the functionalized polymer or copolymer having one or more epoxy ring to make a molar ratio of epoxy to anhydride in the electrospinning composition within the range of 1:1 to 50:1.

12. The method according to claim 11, wherein the molar ratio of epoxy to anhydride is within the range of 4:1 to 6:1.

13. The method according to claim 11, wherein the molar ratio of epoxy to anhydride is within the range of 4.5:1 to 5.5:1.

14. The method according to claim 11, wherein the catalyst is in an amount within the range of 0.01% wt to 0.02% wt with respect to the weight of the functionalized polymer or copolymer.

15. The method according to claim 11, wherein the functionalized copolymer is a styrene/glycidyl methacrylate copolymer, and the catalyst is a tributyl amine.

16. The method according to claim 11, wherein the thermal treatment is performed for a duration longer than 15 minutes.

17. The method according to claim 11, wherein the thermal treatment is performed for a duration within the range of 1 hour to 3 hours.

18. The method according to claim 11, wherein the thermal treatment is performed for a duration within the range of 1.5 hours to 2.5 hours.

* * * * *